United States Patent
Ries-Mueller

(10) Patent No.: US 6,951,525 B2
(45) Date of Patent: Oct. 4, 2005

(54) METHOD AND DEVICE FOR CONTROLLING THE DRIVE UNIT OF A VEHICLE

(75) Inventor: Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 10/785,366

(22) Filed: Feb. 23, 2004

(65) Prior Publication Data

US 2005/0014605 A1 Jan. 20, 2005

(30) Foreign Application Priority Data

Feb. 21, 2003 (DE) .......................................... 103 07 462

(51) Int. Cl.[7] .............................................. B60K 41/02
(52) U.S. Cl. ...................................................... 477/74
(58) Field of Search ............................. 477/70, 71, 74, 477/83, 84

(56) References Cited

U.S. PATENT DOCUMENTS

| | | | | | |
|---|---|---|---|---|---|
| 4,838,397 A | * | 6/1989 | Kurihara et al. | ............... | 477/73 |
| 4,842,113 A | * | 6/1989 | Lutz | ............................ | 477/73 |
| 5,957,805 A | * | 9/1999 | Salecker et al. | ............... | 477/74 |
| 6,386,351 B1 | * | 5/2002 | Salecker et al. | ........... | 192/54.1 |

* cited by examiner

Primary Examiner—Dirk Wright
(74) Attorney, Agent, or Firm—Kenyon & Kenyon

(57) ABSTRACT

A method for controlling the drive unit of a vehicle in which an extended overrun mode having reduced fuel consumption and reduced pollutant emission is possible. A free-wheel mode in which the vehicle operates with the clutch disengaged is set as a function of a driving situation or an operating state of the drive unit. An output variable of the drive unit, such as torque or vehicle speed, is set to a constant value during the transition between an engaged-clutch travel mode and a free-wheel mode.

22 Claims, 8 Drawing Sheets

METHOD AND DEVICE FOR CONTROLLING THE DRIVE UNIT OF A VEHICLE

CROSS-REFERENCE TO RELATED APPLICATIONS

The present application claims priority to Application No. 103 07 462.7, filed in the Federal Republic of Germany on Feb. 21, 2003, which is expressly incorporated herein in its entirety by reference thereto.

FIELD OF THE INVENTION

The present invention relates to a method and a device for controlling the drive unit of a vehicle.

BACKGROUND INFORMATION

In some vehicles, it is possible to use a control unit to electrically operate the clutch if the vehicle is equipped with an automated transmission or an enhanced transmission. In an overrun mode, the clutch between the engine and transmission is engaged, which brakes the vehicle due to the compressor action of the engine and friction. In addition, free-wheel transmissions are believed to be conventional which do not have this disadvantage since they transmit the engine torque only in driving mode, but do not transmit the engine braking torque in overrun mode. However, the vehicle must always be decelerated by the vehicle brake, which can overheat, in particular, during long downhill travel.

Electronic automatic transmissions that engage a certain gear at the request of a control unit—including "neutral," in which no engine torque is transmitted—are also believed to be conventional.

In addition, engine start/stop systems which, however, work only while the vehicle is at a standstill, are believed to be conventional.

SUMMARY

An exemplary embodiment of the present invention for controlling the drive unit of a vehicle, may provide that an output variable of the drive unit, such as a torque or a vehicle speed, is set to a constant value during the transition between engaged-clutch travel mode and free-wheel mode. This may avoid unwanted accelerations and decelerations during the transition between engaged-clutch travel mode and free-wheel mode, thus making the transition smoother.

In an example embodiment of the present invention, the constant value is set for the output variable by coordinating clutch intervention and engagement of a vehicle brake. This may make it possible to avoid the above-mentioned decelerations and accelerations during the transition between engaged-clutch travel mode and free-wheel mode with particular ease and safety.

In an example embodiment of the present invention, the constant value is set for the output variable via a regulator. This may make it possible to set the constant value for the output variable within a very narrow tolerance.

In an example embodiment of the invention, the constant value is set for the output variable via a characteristic map as a function of an engine torque, a vehicle mass, an engine drag torque, a roadway gradient, an instantaneous gear ratio, an engaged gear, or an engaged drive position, etc. This may enable the constant value for the output variable to be implemented particularly easily and without a regulating circuit.

In an example embodiment of the present invention, a braking action of an activated vehicle brake is canceled as a function of the driving situation or the operating state of the drive unit after the transition from engaged-clutch travel mode to free-wheel mode. This may avoid an undesirably strong vehicle acceleration after the transition from engaged-clutch travel mode to free-wheel mode and increases driving comfort.

In an example embodiment of the present invention, a braking action of a vehicle brake is increased as a function of the driving situation or the operating state of the drive unit prior to the transition from free-wheel mode to engaged-clutch travel mode. This may avoid an undesirably strong vehicle deceleration after the transition from free-wheel mode to engaged-clutch travel mode and increases driving comfort.

In an example embodiment of the present invention, a combustion engine of the internal combustion engine is shut down in free-wheel mode. This may enable fuel consumption and pollutant emissions to be easily reduced to the greatest possible extent.

In an example embodiment of the present invention, a combustion drive is restarted by the vehicle engine by sequentially activating the fuel injection system, using a charge regulator and/or supported by an electric motor prior to the transition from free-wheel mode to engaged-clutch travel mode. This may make it possible to restart the engine as smoothly as possible and thus-increase driver comfort.

In an example embodiment of the present invention, the engine speed is regulated to a predefined speed difference from the speed of the power train prior to the engine being reconnected to the power train. This also may make it possible to restart the engine as smoothly as possible.

DETAILED DESCRIPTION

Figure 1:
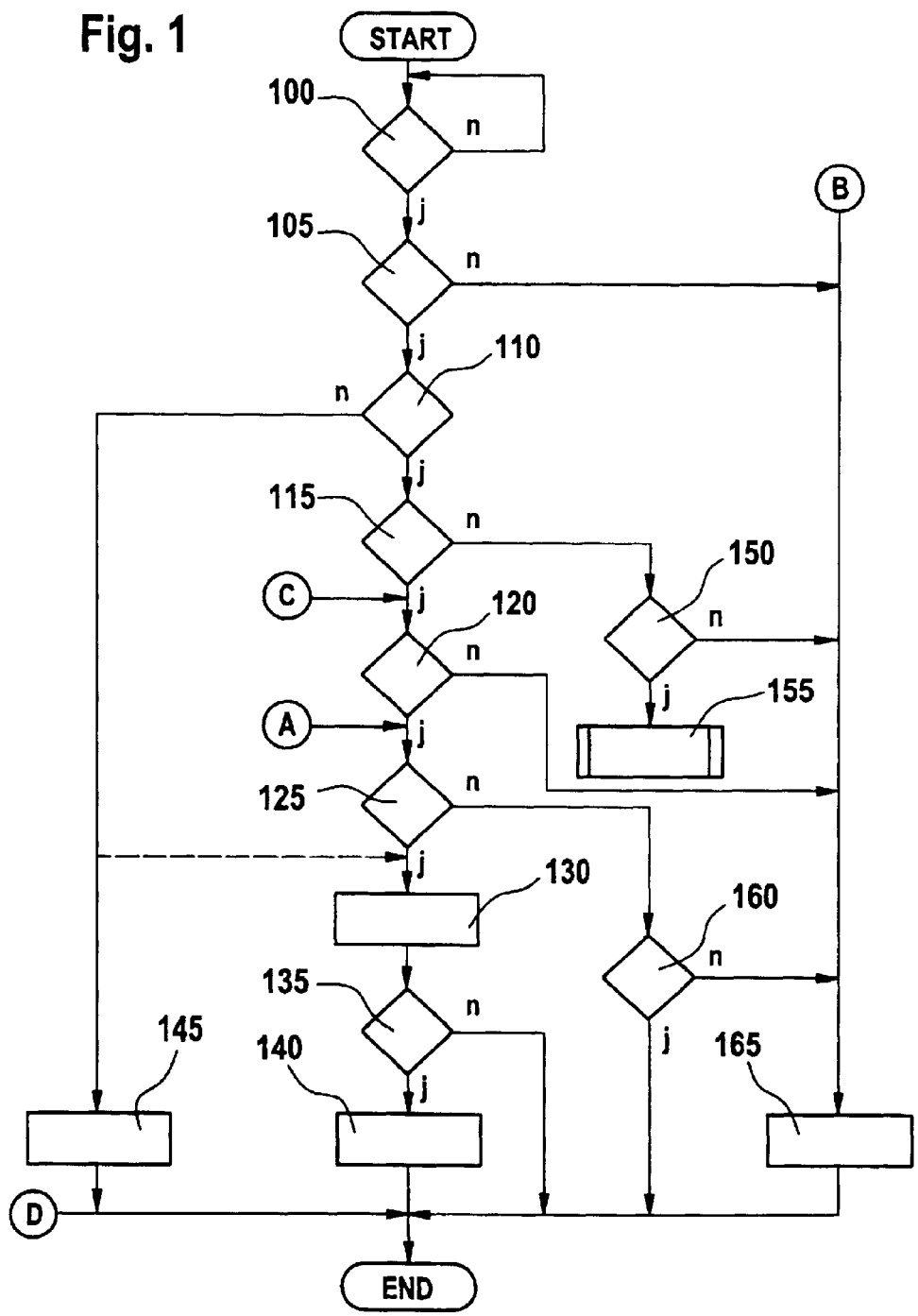
FIG. 1 shows a flow chart for describing the method according to an example embodiment of the present invention.

The method according to an example embodiment of the present invention may be implemented, for example, in an engine control unit, a transmission control unit and/or a clutch control unit of a vehicle, for example, in the form of a computer program. According to this exemplary embodiment, the vehicle is provided, for example, with an internal combustion engine. During vehicle operation, driving situations arise in which the vehicle engine does not perform a driving action, but rather acts in a more or less braking fashion in an overrun mode. In this overrun mode, an engine braking torque is transmitted from the rotating driving wheels to the engine via the transmission and clutch. Overrun mode occurs, in particular, when the driver removes his foot from the accelerator. However, this does not always mean that the driver wishes to actually brake the vehicle using the engine braking torque, i.e., the engine brake. According to an example embodiment of the present invention, the transmission of engine braking torque to the engine is therefore initially interrupted, for example, by disengaging the clutch, when overrun mode is detected. Overrun mode is detectable, for example, by the fact that the accelerator has not been pressed for a first predefined period of time. The engine brake is thus deactivated, and the vehicle decelerates more gently. As a result, the vehicle is in idle mode, making the rolling phase longer than when the engine brake is activated. This reduces fuel consumption and pollutant emission per trip segment. The engine may also be shut down to further reduce fuel consumption and pollutant emission per trip segment. Shutting down the engine in this manner has the further advantage that cooler air no longer passes through a catalytic converter that may be present. This means that the catalytic converter undergoes much less cooling after the engine has been shut down than it does in overrun mode. This reduces pollutant emissions when the engine is subsequently restarted.

If the roadway has a gradient, the roadway incline may be determined on the basis of the vehicle acceleration derived from the vehicle speed. This may be carried out in the vehicle control unit on the basis of the measured vehicle speed supplied to this control unit by implementing the method according to an example embodiment of the present invention in the form of a computer program. If the gradient thus determined or the measured acceleration is higher than a predefined value, the interruption of the engine braking torque transmission may be canceled by the control unit. If the engine is shut down, it must first be restarted to subsequently engage the clutch and retransmit the engine braking torque to the engine. This ensures that sufficient braking action is available to brake the vehicle in the event of a steep gradient. The predefined value for the gradient may be permanently preset in the control unit concerned, or it may be entered by the driver on a vehicle input unit. The engine should be restarted as smoothly as possible so that it is comfortable for the driver. Ideally, this is done by setting the engine speed to the speed of the driving axle, taking all gear ratios into account. This is achievable by sequentially activating the injection system. In addition or alternatively, the engine may be restarted using a charge regulator in which the air supply to the cylinders of the engine is successively increased to the necessary setpoint value by suitably controlling a throttle. In addition or alternatively, the restart of the engine may be supported by an electric motor that may be designed, for example, as an integrated starter/generator. Restarting the engine via electric drive support also makes it possible to smoothly activate or start the engine. In addition or alternatively, the interruption of the engine braking torque transmission may also be canceled if a second predefined period of time has passed since the transmission of the engine braking torque was interrupted. In this case, it is assumed, after an adequately long second predefined period of time, that the driver does indeed wish to brake, since he did not press the accelerator in the meantime and thus did not cancel overrun mode. In connection with the roadway gradient, the interruption of the engine braking torque transmission may be canceled only at the end of the second predefined period of time when the roadway gradient exceeds the predefined value and the engine brake may be reactivated. If the predefined gradient and the second predefined period of time are suitably selected, this makes it possible to reach a compromise between fuel-efficient and pollutant-reducing operation and protecting the brake linings for braking the vehicle on the gradient.

When the driver presses the accelerator again, the end of vehicle overrun mode is detected, the engine is restarted in the manner described above, and the clutch is engaged.

In addition or alternatively, the engine braking torque may be retransmitted when the vehicle is in overrun mode upon applying a vehicle brake. The detection of the brake application may also be supplied to the control unit by carrying out the method according to an example embodiment of the present invention. Based on the vehicle brake application, the control unit detects a braking request from the driver that thus takes priority over fuel conservation. In this case, the interruption in engine braking torque transmission is canceled to protect the brake, and the engine brake is reactivated in the present overrun mode.

In addition or alternatively, the engine braking torque may be retransmitted when the vehicle is in overrun mode if a reduced braking action of the vehicle brake is detected. For safety reasons, it may be important in this case for the full engine braking action to be available. A reduced braking action may occur, for example, in the following situations: if the brake linings are overheated (so-called fading); if the brake circuit fails; if an electrohydraulic or electromechanical brake is used; if an error is detected that deactivates at least one wheel brake. The detection of the reduced braking action is also supplied to the control unit by implementing the method according to an example embodiment of the present invention.

In addition or alternatively, the engine may be restarted and the clutch engaged to transmit the engine braking torque during vehicle overrun mode even if the vehicle speed drops below a predefined vehicle speed. The detected vehicle speed is also supplied to the control unit by implementing the method according to a example embodiment of the present invention. The control unit also interprets the drop of the vehicle speed below the predefined value as the driver's intent to brake the vehicle or the imminent end of the overrun mode when the driver is likely to press the accelerator again. For this purpose, an especially low predefined vehicle speed may be selected, for example, in the range of 10 km/h.

The method according to an example embodiment of the present invention is explained in greater detail below by way of an example on the basis of the flow chart in FIG. 1. The program described below is implemented in a vehicle control unit as described. After the program starts, a program point 100 checks whether the engine has been started and the initiation of the overrun mode has been enabled. If so, the method branches to a program point 105; otherwise, it branches back to program point 100.

Program point 105 checks whether the vehicle overrun mode has been activated, i.e., in this example, whether an operation of the accelerator has ended. If so, the method branches to a program point 110; otherwise it branches to program point 165. The detected accelerator position is also supplied to the control unit for this purpose.

Program point 110 checks, on the basis of the vehicle speed, whether this speed is a value other than zero. If so, the method branches to a program point 115; otherwise it branches to program point 145. At program point 145, a vehicle start/stop system that interrupts the power connection between the engine and the transmission is activated, and the engine is shut down until the driver presses the accelerator again. The program subsequently ends. If the vehicle does not have a start/stop system, the method branches from program point 110 to a program point 130 according to the dotted line in FIG. 1 if program point 110 determines that the vehicle speed is zero.

Program point 115 checks whether the vehicle brake is not applied. For this purpose, for example, the position of the vehicle brake pedal may be evaluated and supplied to the control unit. If the brake is not applied, the method branches from program point 115 to a program point 120. Otherwise, it branches from program point 115 to a program point 150.

Program point 120 checks whether the first predefined period of time has ended since the beginning of the overrun mode, i.e., since the driver released the accelerator. If so, the method branches to a program point 125; otherwise, it branches to program point 165.

Program point 125 checks whether the vehicle speed is above a first predefined value, which may be, for example, 25 km/h. If so, the method branches to a program point 130; otherwise, it branches to program point 160.

Program point 160 checks whether the vehicle speed is above a second predefined value, which may be, for example, 10 km/h. If so, the program ends; otherwise, the method branches to program point 165.

At program point 130, the transmission of the engine braking torque in overrun mode is interrupted, thus deactivating the engine brake. This may be accomplished, for example, by disengaging the clutch. The engine is thus placed in an idle state. A program variable is also set. The method subsequently branches to a program point 135.

Program point 135 checks whether the engine may be shut down. If so, the method branches to a program point 140; otherwise the program ends. To check whether the engine may be shut down, the engine temperature, a catalytic converter temperature, a charge state of the vehicle battery and/or similar values, etc. may be evaluated. For this purpose, the engine temperature and/or catalytic converter temperature and/or charge state of the vehicle battery is supplied to the control unit by suitable measuring devices. If at least one of the above-mentioned variables of engine temperature, catalytic converter temperature and charge state of the vehicle battery exceeds a corresponding predefined value, program point 135 determines that the engine may be shut down. For safety reasons, all three aforementioned variables of engine temperature, catalytic converter temperature and charge state of the vehicle battery may be required to be above the corresponding predefined value in order for program point 135 to determine that the engine may be shut down and to allow the method to branch to program point 140.

At program point 140, the control unit shuts down the engine, for example, by interrupting the supply of air to the cylinders or by discontinuing ignition in the case of an internal combustion engine with externally supplied ignition or by interrupting the fuel injection or by combining several of the above-mentioned measures. The program subsequently ends.

At program point 165, the control unit restarts the engine prior to the transition from free-wheel mode to engaged-clutch travel mode, in the manner described above, by sequentially employing the fuel injection system, using a charge regulator and/or supported by the electric motor, thereby allowing the engine to start as smoothly as possible. Ideally, the engine speed is set to a certain difference from the speed of the driving axle or power train prior to reconnecting the engine to the power train, taking the gear ratios into account. The clutch is then engaged again, the program variable is reset, and the vehicle is enabled for restarting an overrun mode. If the vehicle is still in overrun mode, i.e., if the accelerator has not yet been pressed again, engaging the clutch triggers retransmission of the engine brake torque. If overrun mode is not active at program point 165, i.e., if the accelerator is pressed, engaging the clutch causes the engine output torque to be transmitted from the engine to the driving wheels via the clutch and the transmission so that the vehicle is driven by the engine, and overrun mode is inactive. The program subsequently ends.

At program point 150, the control unit checks whether the program variable has been set. If so, the method branches to a program point 155; otherwise, it branches to program point 165.

According to this example, two different example embodiments may be implemented at program point 155. FIG. 2 shows a one example embodiment. In the manner described above, a program point 200 first checks whether the roadway gradient has exceeded a predefined value, for example, 5 percent. If so, the method branches to a program point 205; otherwise it branches to program point 120 as illustrated in FIG. 1. Program point 205 checks whether the second predefined period of time has expired since the engine braking torque transmission was interrupted. If so, the method branches to program point 125 as illustrated in FIG. 1; otherwise, it branches to program point 165 as illustrated in FIG. 1. At the time the engine braking torque transmission is interrupted, a timer whose runtime corresponds to the second predefined period of time may be started in the control unit. Program point 205 may then check whether the timer has been reset, i.e., whether the second predefined period of time has expired. The second predefined period of time may be varied as a function of deceleration or brake disk temperature. The greater the deceleration or the higher the brake disk temperature, the shorter the second predefined period of time.

Figure 2:
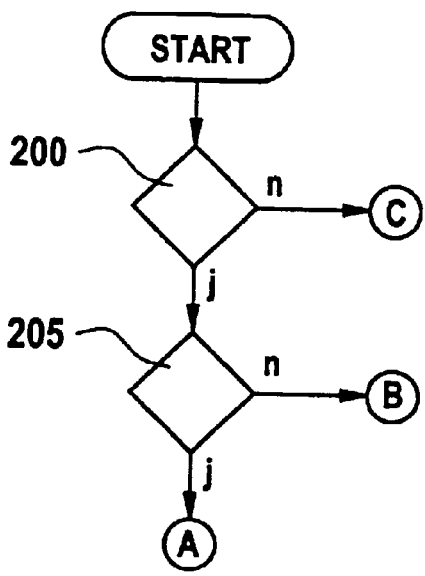
FIG. 2 shows an example embodiment of the present invention.
Figure 3:
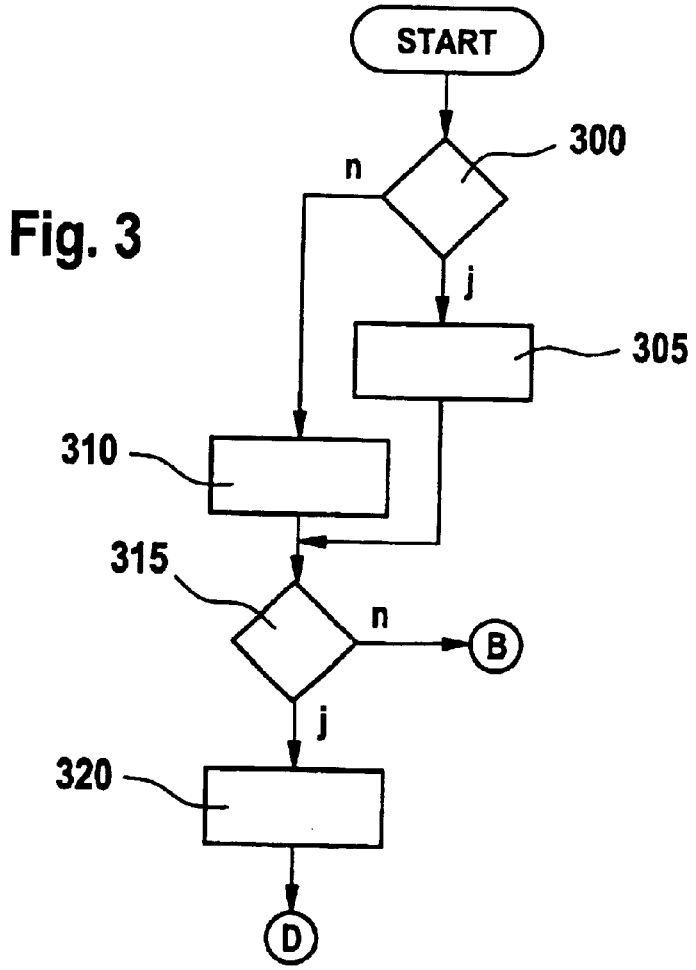
FIG. 3 shows an example embodiment of the present invention, including alternative procedures in one portion of the flow chart illustrated in FIG. 1.

According to an alternative example embodiment, the method runs according to the flow chart illustrated in FIG. 3 at program point 155 of FIG. 1. A program point 300 checks whether a brake application pressure of the vehicle brake is less than a predefined value, for example, 5 bar. If so, the method branches to a program point 305; otherwise, it branches to a program point 310. The brake application pressure is a measure of brake pedal operation by the driver. If the brake application pressure is below the predefined value, the control unit assumes that the driver has only lightly pressed the brake pedal, and the desired braking action may be largely achieved by the engine brake. As a result, the control unit suppresses the vehicle brake pressure at program point 305 or allows it to build up only at one vehicle axle. At program point 305, the method branches to a program point 315. At program point 310, the control unit has detected a brake application pressure that is above the predefined value, for example, based on the measured brake pedal position, and allows the buildup of a corresponding brake pressure that is supported by activating the engine brake. If the brake application pressure exceeds the predefined value, the control unit assumes that the driver has pressed the brake pedal firmly. After program point 310, the method also branches to program point 315.

The buildup in brake pressure at program point 305 and, in particular, at program point 310 may be implemented particularly easily and ideally with the help of an electrohydraulic brake.

At program point 315, the control unit checks whether a possible engine drag regulator of the vehicle is active. If so, the method branches to a program point 320; otherwise, it branches to program point 165 illustrated in FIG. 1. As at program point 165 according to FIG. 1, the engine is started at program point 320 in the manner described for FIG. 1, and the clutch is engaged to transmit the engine braking torque. The program variable is also reset, and the vehicle is enabled for activation of a new overrun mode. Although the engine brake is activated in this manner, it is not regulated by the engine drag regulator at program point 320. As described for program point 305 and program point 310, respectively, the brake pressure is built up, for example, using the electrohydraulic brake, and may be additionally regulated by an antilock system of the vehicle.

The program ends after program point 320.

If program point 315 determines that the engine drag regulator is active, the activated engine brake is regulated by the engine drag regulator at program point 165 in addition to the description according to FIG. 1. As described for program point 305 and program point 310, respectively, the brake pressure is also regulated by a possible electrohydraulic brake, if necessary, with support from the vehicle antilock system.

According to another example embodiment in which the vehicle does not have an engine drag regulator and the driver brakes while the antilock system is being activated, the method may be carried out so that the interruption of the engine braking torque transmission is not canceled even though the brake has been applied, and the engine brake is not reactivated, but instead maintains the driving state, set by interrupting the engine braking torque transmission, in which the vehicle travels freely in idle mode, if necessary after shutting down the engine, and braking takes place solely via the antilock system.

According to the exemplary embodiments described above, the interruption of the engine braking torque transmission is canceled as a function of a driving situation or an operating state of the drive unit, and the engine brake is reactivated. The dependency on the driving situation is described, by an example, by traveling along a roadway that has a gradient. The dependency on the operating status of the drive unit is described, by an example, on the basis of the second predefined period of time, the application of the brake pedal, or the vehicle speed.

If the vehicle is equipped with a free-wheel transmission, it is also possible to influence the free-wheel transmission electromechanically such that it cancels the interruption of the engine braking torque transmission and reactivates the engine brake in certain driving situations, for example, in the case of roadways having a gradient or in operating states of the drive unit such as vehicle brake application, expiration of the second predefined period of time since interruption of the engine braking torque transmission, or the vehicle speed.

In addition, the vehicle driver may activate the method according to an example embodiment of the present invention via an input unit of the vehicle, for example, on a gear selection lever, a switch, a multifunction lever, similar device, etc., thereby extending the overrun mode in the manner described above and minimizing fuel consumption and pollutant emission. The activation of the method according to an example embodiment of the present invention, which provides a kind of free-wheel function having the longest possible periods of free vehicle travel, may also be displayed on a vehicle display device, for example, a display of a multifunction instrument panel in the vehicle.

The implementation according to an example embodiment of the present invention of the transition between an engaged-clutch travel mode, for example, overrun mode, and a free-wheel mode in which the vehicle travels with the clutch disengaged to avoid unwanted accelerations or decelerations during a transition of this type, is described by an example below.

A goal is to maintain an output variable of the drive unit, for example, a torque or a vehicle speed, at largely a constant value during the transition. In the case of a torque, for example, the variable may be a wheel torque of one or more driving wheels of the vehicle.

In the discussion below, it is assumed by an example that the vehicle speed is to be maintained at a constant value during the transition.

Figure 4:
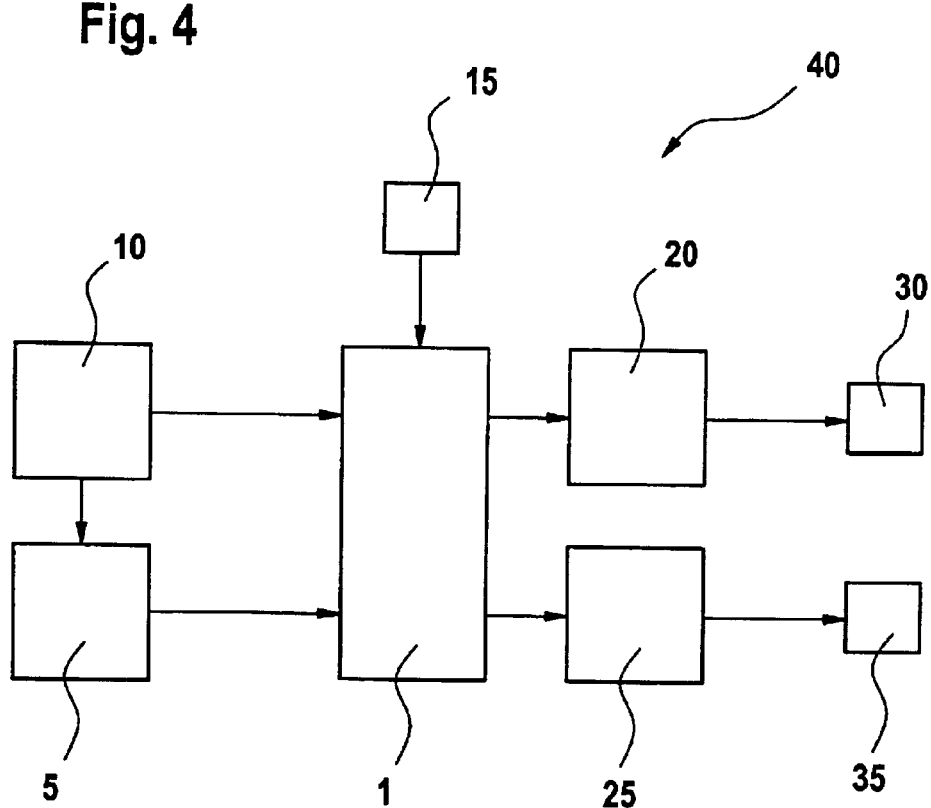
FIG. 4 shows a block diagram of a regulating circuit for setting a constant value for an output variable of the drive unit during the transition between engaged-clutch travel mode and free-wheel mode.

According to an example embodiment of the present invention as shown in FIG. 4, a first device 40 for controlling the drive unit may be provided, which may be integrated, for example, into an engine controller of the vehicle. First device 40 includes regulating unit 1. Regulating unit 1 is connected to a setpoint speed detecting unit 5 and an actual speed detecting unit 10. Actual speed detecting unit 10 may be designed, for example, as a speed sensor and measures the instantaneous vehicle speed, i.e., the actual speed, in a manner that may be conventional. Setpoint speed detecting unit 5 detects the instantaneous actual speed and selects it as the setpoint speed at a time prior to the start of the transition and after detecting the point at which a transition of this type is to take place, for example, after detecting the overrun mode or after detecting a condition for retransmitting the engine braking torque.

The actual speed and setpoint speed are supplied to regulating unit 1. Regulating unit 1 is also connected to an activation unit 15, for example, a control element operatable by the driver via which the regulator may be activated or deactivated.

Regulating unit 1 is also connected to a clutch presetting unit 20 and a vehicle brake presetting unit 25. As a function of a controlled difference between the actual speed and the setpoint speed, clutch presetting unit 20 forms a default value for a clutch intervention and controls a clutch controller 30 for implementing the clutch intervention. As a function of a controlled difference between the actual speed and the setpoint speed, vehicle brake presetting unit 25 also forms a default value for a vehicle brake intervention and controls a vehicle brake controller 35 for implementing the vehicle brake intervention. Vehicle brake controller 35 implements the default value for the vehicle brake intervention by applying one or more vehicle brakes. Ordinarily, by pressing the brake pedal, the driver may also apply these vehicle brakes, which are distinct from the engine brake.

Figure 6:
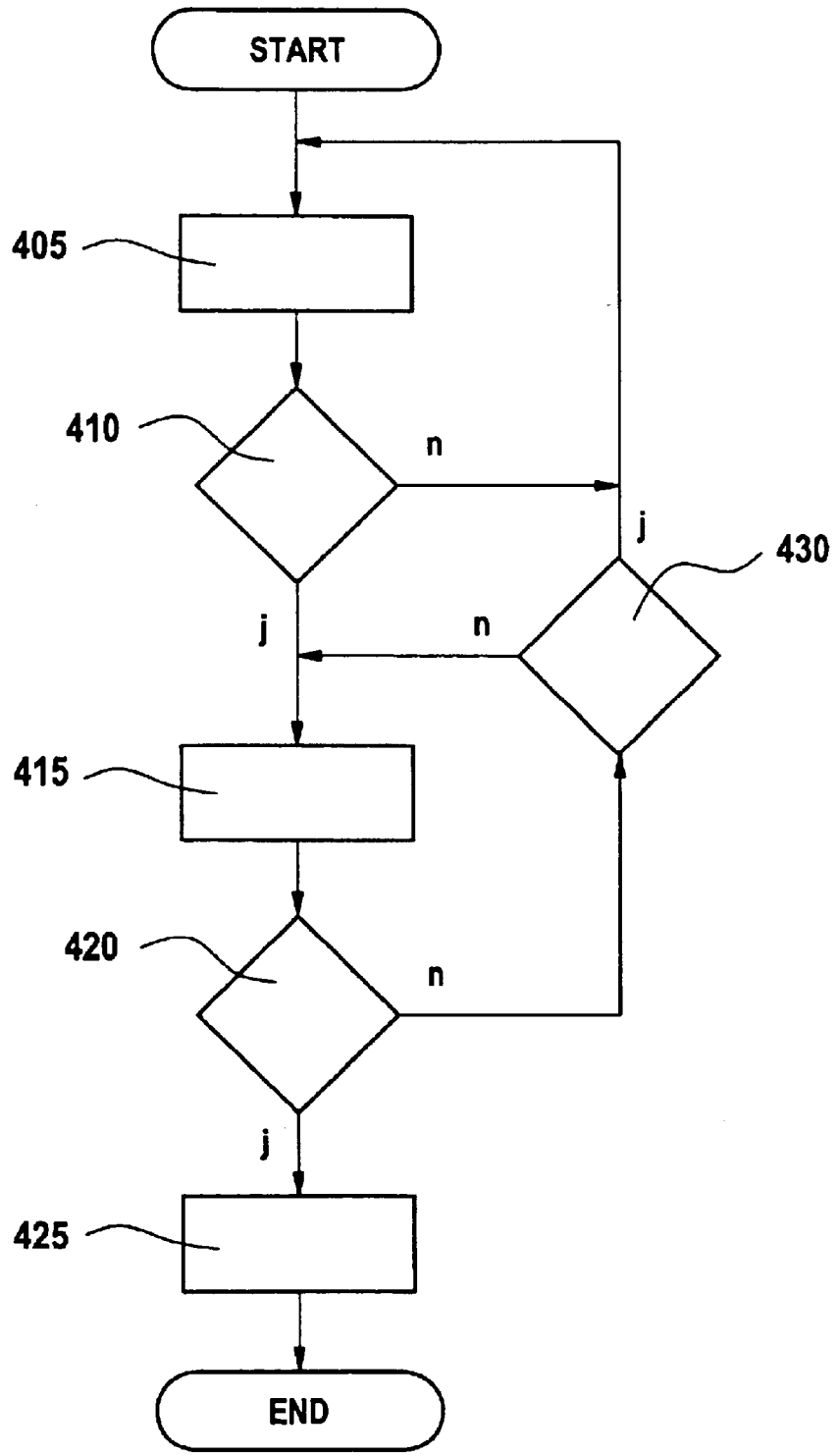
FIG. 6 shows a first flow chart of the regulation sequence for setting a constant value for an output variable of the drive unit during the transition from engaged-clutch travel mode to free-wheel mode.

The operation of regulator unit 1 is described by an example on the basis of the flow chart shown in FIG. 6. The flow chart in FIG. 6 describes the transition from engaged-clutch travel mode to free-wheel mode and represents one possible manner of implementing program point 130 according to the flow chart in FIG. 1 for interrupting the engine braking torque transmission in overrun mode by disengaging the clutch, provided that regulating unit 1 is activated via activation unit 15. The flow chart according to FIG. 6 is then started when program point 130 is reached according to the flow chart in FIG. 1.

At a program point 405, regulating unit 1 causes clutch presetting unit 20 to trigger a clutch engagement, whereupon the vehicle clutch is disengaged by a predefined incremental value. Clutch presetting unit 20 controls clutch controller 30 such that this predefined incremental value for disengaging the clutch is implemented. The method subsequently branches to a program point 410.

At program point 410, regulating unit 1 checks whether the actual speed is greater than the setpoint speed. If so, the method branches to a program point 415; otherwise, it branches back to program point 405.

At a program point 415, regulating unit 1 causes vehicle brake presetting unit 25 to trigger a vehicle brake engagement, in which, via a vehicle brake controller 35, the vehicle brake or brakes is/are controlled by a second predefined incremental value for incrementing a vehicle brake torque. The method subsequently branches to a program point 420.

At program point 420, regulating unit 1 checks whether the vehicle clutch is completely disengaged. This may be communicated to regulating unit 1, for example, with the help of a sensor for detecting the clutch position or by a signal from clutch controller 30. If the vehicle clutch is already completely disengaged, the method branches to a program point 425; otherwise, it branches to a program point 430.

At program point 430, regulating unit 1 checks whether the actual speed is less than or equal to the setpoint speed. If so, the method branches to program point 405; otherwise, it branches to program point 415.

At program point 425, regulating unit 1 causes vehicle brake controller 35 to continuously reduce the vehicle braking torque via vehicle brake presetting unit 25. Continuous reduction of the vehicle braking torque is predefinable such that undesirable abrupt acceleration is avoided. Continuous reduction of the vehicle braking torque may be implemented, for example, via a time-based ramp function applied on a test bench and/or during road tests as a function of the driving situation or the operating state of the drive unit. Multiple time-based ramp functions applied in this manner may be stored in regulating unit 1 or in a memory assigned to regulating unit 1 by assigning them to a given driving situation or by assigning them to a given operating state of the drive unit. To select a suitable time-based ramp function at the end of the transition in program point 425, the present driving situation may be taken into account in a conventional manner, for example, on the basis of the gradient incline and the operating state of the drive unit or on the basis of operating parameters such as engine speed and gear ratio as well as, for example, engine temperature, intake manifold pressure, etc., and environmental conditions such as ambient temperature, ambient pressure, etc. The program subsequently ends.

Figure 7:
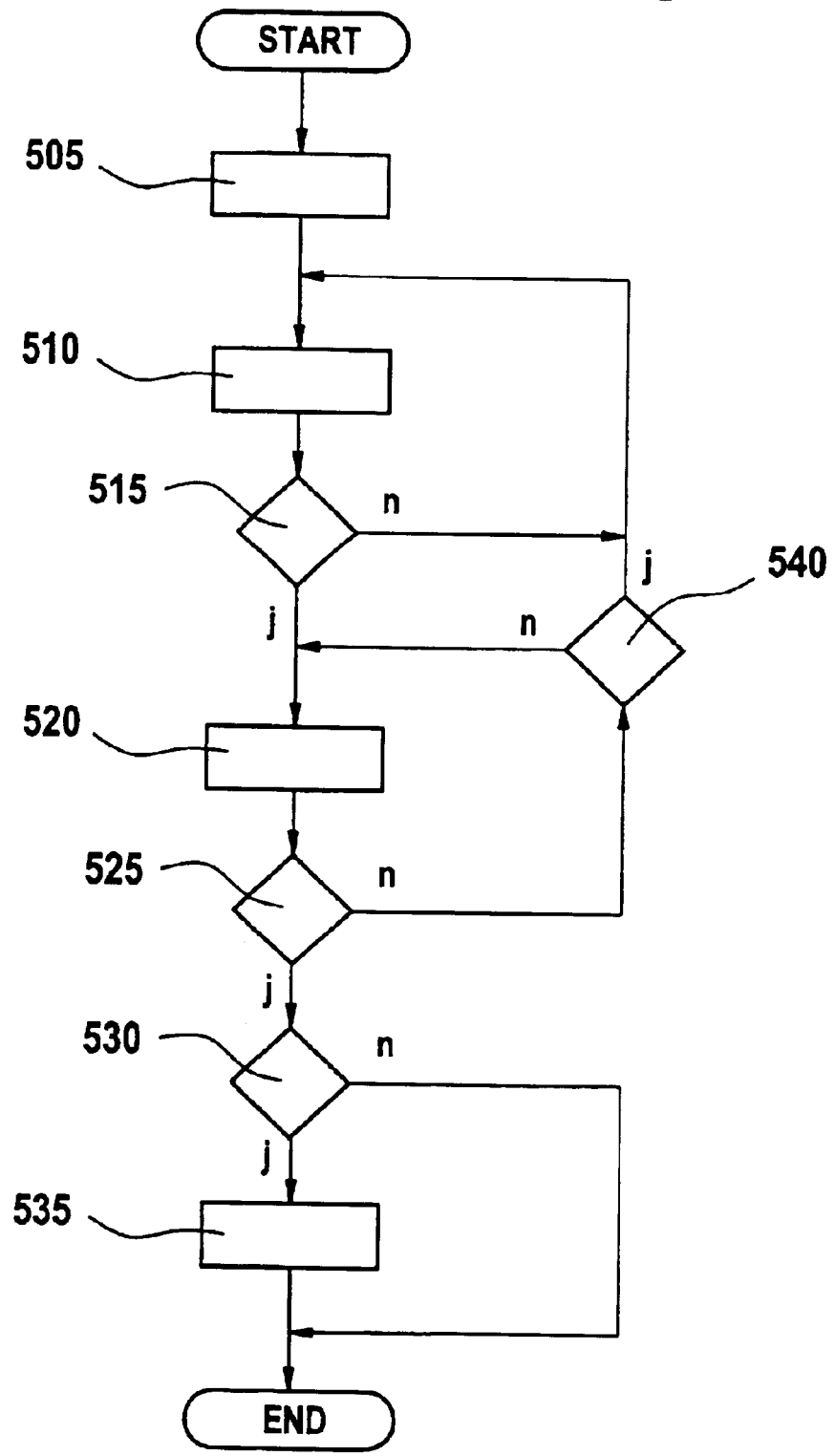
FIG. 7 shows a flow chart of the regulation sequence for setting a constant value for an output variable of the drive unit during the transition from free-wheel mode to engaged-clutch travel mode.

FIG. 7 shows a flow chart that describes the operation of regulating unit 1 during a transition from free-wheel mode to engaged-clutch travel mode. At program point 165 of the flow chart according to FIG. 1, this transition takes place in the event that the accelerator is not pressed, i.e., if the vehicle is in overrun mode. The flow chart according to FIG. 7 specifically describes the process of engaging the clutch. The engine may be started, for example, as described above. Alternatively, the engine my be started within two to three combustion cycles by directly starting, for example, a direct-injection gasoline engine without a starter. Direct starting in this manner supports an efficient and comfortable start/stop mode in which the engine is started from a vehicle standstill, for example, when stopped at a traffic light.

To run the program according to FIG. 7, regulating unit 1 must again be activated via activation unit 15.

After the program is started, regulating unit 1 causes vehicle brake controller 35, via vehicle brake presetting unit 25 at a program point 505, to continuously increase the vehicle braking torque to a predefined vehicle breaking torque value that is stored, for example, in regulating unit 1, for example, also according to a predefined time-based ramp function. The continuous increase in vehicle braking torque may be predefined such that undesirable abrupt vehicle deceleration is avoided when the clutch is engaged. A continuous increase in the vehicle braking torque may be implemented, for example, via a time-based ramp function applied on a test bench and/or during road tests as a function of the driving situation or the operating state of the drive unit. Multiple time-based ramp functions applied in this manner may be stored in regulating unit 1 or in a memory assigned to regulating unit 1 by assigning them to a given driving situation or by assigning them to a given operating state of the drive unit. To select a suitable time-based ramp function directly prior to the beginning of the transition at program point 505, the present driving situation may be taken into account in a conventional manner, for example on the basis of the gradient incline and the operating state of the drive unit, for example, on the basis of operating parameters such as engine speed and gear ratio as well as, for example, engine temperature, intake manifold pressure and environmental conditions such as ambient temperature and ambient pressure. In this manner, undesirable, in particular, abrupt vehicle deceleration may be avoided when the clutch is engaged. The predefined vehicle braking torque may be selected, for example, so that it is approximately equal to the engine braking torque directly at the end of the transition to engaged-clutch travel mode. The predefined vehicle braking torque value may also be applied, for example, during road tests, such that it is approximately equal to a mean value of the engine braking torques beginning immediately at the end of the transition to engaged-clutch travel mode in these road tests. The predefined engine braking torque value may also be stored in regulating unit 1 or in a memory assigned to regulating unit 1. The method subsequently branches to a program point 510.

At program point 510, regulating unit 1 causes clutch controller 30, via clutch presetting unit 20, to engage the vehicle clutch by a first predefined decremental value. The method subsequently branches to a program point 515.

At program point 515, regulating unit 1 checks whether the actual speed is less than the setpoint speed. If so, the method branches to a program point 520; otherwise, it branches back to program point 510.

At program point 520, regulating unit 1 causes vehicle brake controller 35, via vehicle brake presetting unit 25, to decrement the vehicle braking torque by a second predefined decremental value. The method subsequently branches to a program point 525.

At program point 525, regulating unit 1 checks whether the vehicle clutch is completely engaged. This may be accomplished with the help of the clutch sensor described above or an information signal of clutch controller 30. If the vehicle clutch is completely engaged, the method branches to a program point 530; otherwise, it branches to a program point 540.

At program point 540, regulating unit 1 checks whether the actual speed is greater than or equal to the setpoint speed. If so, the method branches back to program point 510; otherwise, it branches back to program point 520.

At program point 530, regulating unit 1 checks whether a vehicle braking torque is still present. This may be communicated to regulating unit 1, for example, by vehicle controller 35. If a vehicle braking torque is still present, the method branches to a program point 535; otherwise, the program ends.

At program point 535, regulating unit 1 causes vehicle brake controller 35 to reduce, via vehicle brake presetting unit 25, the vehicle braking torque either continuously or by using the time-based ramp function described above, thereby avoiding abrupt vehicle acceleration. The program subsequently ends.

The incremental and decremental values described above should be selected so that their implementation does not abruptly decelerate or accelerate the vehicle to a degree that is noticeable to the driver. The incremental and decremental values described above may also be stored in regulating unit 1 or an assigned memory.

Regulating unit 1 thus helps coordinate the brake and clutch interventions, which may ensure a largely constant vehicle speed value for the transition. Regulating unit 1 may coordinate the brake and clutch interventions such that generally, for the transition, a largely constant value for an output variable of the drive unit, for example, a wheel torque, may be implemented.

Figure 5:
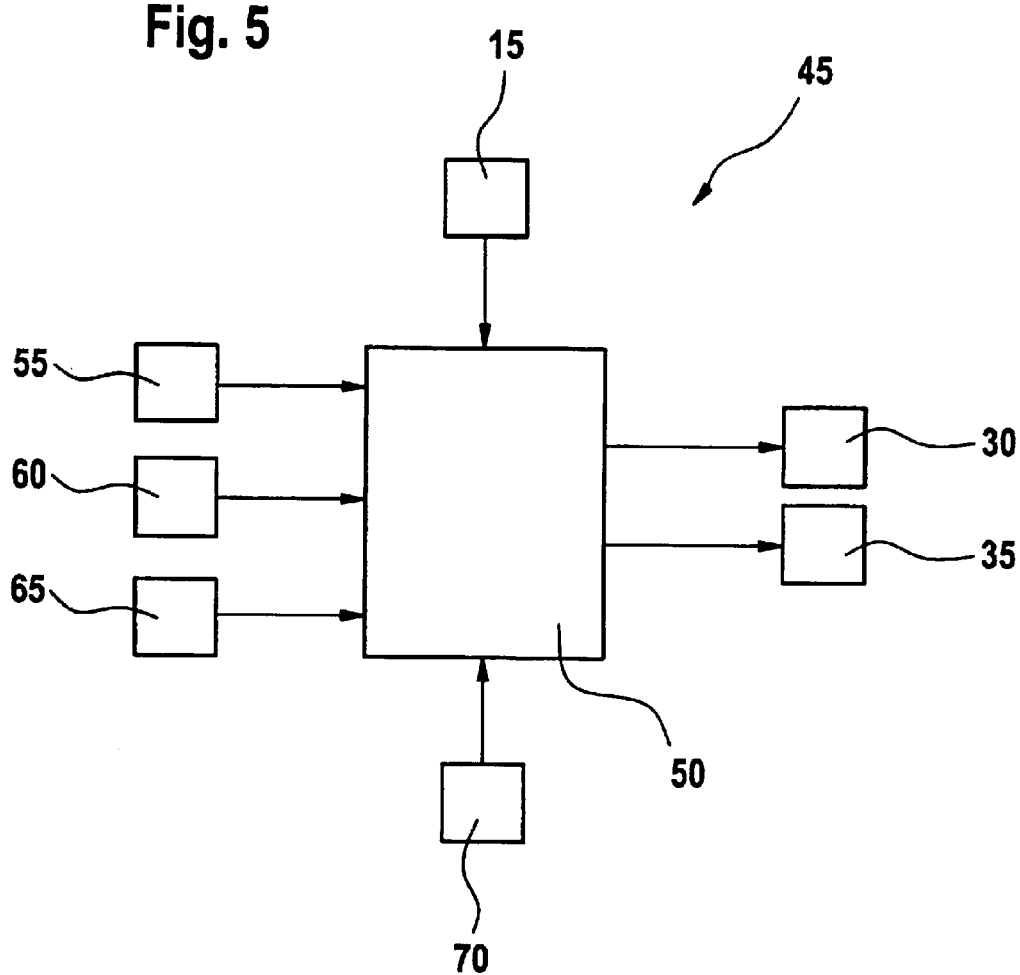
FIG. 5 shows a block diagram of a control system for setting the constant value for the output variable of the drive unit during the transition between engaged-clutch travel mode and free-wheel mode.

Alternatively, a second device 45 may be used instead of first device 40. Second device 45 may also be implemented in the vehicle engine controller. Second device 45 is illustrated in FIG. 5 in the form of a block diagram and includes a control device 50. Control device 50 is connected to activation unit 15. In addition, a vehicle mass detecting unit 55, a gradient detecting unit 60, a transmission controller 65 and an engine speed detecting unit 70 are connected to control device 50. Vehicle mass detecting unit 55 detects the vehicle mass in a conventional manner, for example, on the basis of the vehicle dynamic equation. Alternatively, a vehicle mass value may be stored in vehicle mass detecting unit 55. Gradient detecting unit 60 detects the gradient of the roadway currently being traveled, for example, on the basis of a vehicle speed detected by a speed sensor and a change in speed or acceleration derived therefrom. Transmission controller 65 supplies control device 50 with a value for the instantaneous gear ratio, in particular for an engaged gear or an engaged drive position. Engine speed detecting unit 70 may be designed, for example, in a conventional manner, as a speed sensor that measures the speed of the engine.

Control device 50 is connected to clutch controller 30 and vehicle brake controller 35. A characteristic map that provides a first curve over time for the clutch intervention to clutch controller 30 and a second curve over time for the vehicle brake intervention to vehicle brake controller 35 as a function of the detected engine speed, the detected vehicle mass, the detected roadway gradient and the instantaneous gear ratio is stored in control device 50. Clutch controller 30 thus operates the vehicle clutch according to the first curve over time. Vehicle brake controller 35 correspondingly applies the vehicle brake or brakes according to the second curve over time.

The characteristic map in control device 50 may be determined, for example, with the help of road tests, so that the clutch intervention and the brake intervention are coordinated with the help of the first curve over time and the second curve over time as a function of the engine speed, vehicle mass, roadway gradient and instantaneous gear ratio such that, for the transition, a largely constant value for an output variable of the drive unit, for example, the vehicle speed or wheel torque, may be implemented. For this purpose, the engine braking torque in overrun mode must be decreased by disengaging the clutch during the transition from engaged-clutch travel mode to free-wheel mode to the same extent that the vehicle braking torque is increased by the intervention of the vehicle brake. This results in a largely constant overall braking torque for the transition period. It should be noted that the vehicle braking torque does not include the engine braking torque and the engine braking torque does not include the vehicle braking torque.

Figure 8:
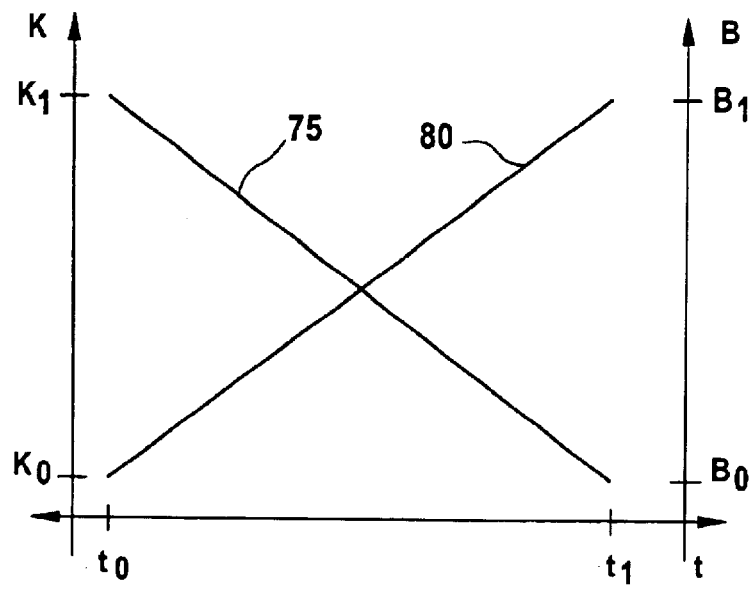
FIG. 8 shows a first curve over time of a clutch and a vehicle brake intervention for the control system for setting the constant value for the output variable of the drive unit during the transition from engaged-clutch travel mode to free-wheel mode.

FIG. 8 shows a first example of the first curve over time and the second curve over time. In FIG. 8, clutch intervention K and brake intervention B are plotted over time t. The transition period from engaged-clutch travel mode to free-wheel mode extends from a first point in time t0 to a second point in time t1. From first point in time t0 to second point in time t1, the clutch intervention drops from a first value K1 to a second value K0. First value K1 corresponds to a completely engaged clutch, and second value K0 corresponds to a completely disengaged clutch. For the sake of simplicity, the first curve over time for the clutch intervention according to FIG. 8 is linear and identified by reference number 75. From first point in time t0 to second point in time t1, the brake intervention rises from a first value. B0 to a second value B1. First value B0 corresponds, for example, to a vehicle braking torque zero, while second value B1 represents a vehicle braking torque that largely equals the engine braking torque at first point in time to, and thus, the torque directly prior to the transition. According to FIG. 8, the second curve over time for the brake intervention is also linear and is identified by reference number 80.

Figure 9:
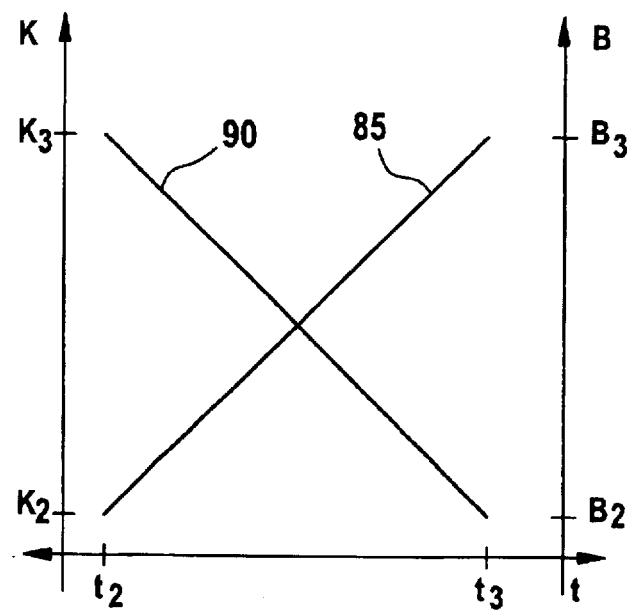
FIG. 9 shows a second curve over time of a clutch and a vehicle brake intervention for the control system for setting the constant value for the output variable of the drive unit during the transition from free-wheel mode to engaged-clutch travel mode.

FIG. 9 shows a second example of the first curve over time and the second curve over time. In FIG. 9, clutch intervention K and brake intervention B are again plotted over time t. The transition period from free-wheel mode to engaged-clutch travel mode extends from a third point in time t2 to a fourth point in time t3. From the third point in time t2 to the fourth point in time t3, the clutch intervention rises from a third value K2 to a fourth value K3, in a linear fashion in this example, according to a first curve over time 85 during the transition from free-wheel mode to engaged-clutch travel mode. Third value K2 corresponds to a completely disengaged clutch, and fourth value K3 corresponds to a completely engaged clutch. From third point in time t2 to fourth point in time t3, the brake intervention drops from a third value B3 to a fourth value B2 in a linear fashion in this example. Third value B3 corresponds to a vehicle braking torque that was set prior to the transition from free-wheel mode to engaged-clutch travel mode and may be more or less equal to the engine braking torque to be set by the transition once the clutch is completely engaged. Fourth value B2 corresponds, for example, to vehicle braking torque zero. According to FIG. 9, the second curve over time for the transition from free-wheel mode to engaged-clutch travel mode is identified by reference number 90.

Second value B1 and fourth value B2 for the brake intervention and the vehicle braking torque to be set, respectively, may be modeled by the characteristic map as components or end points of the second curve over time as a function of the input variables of the characteristic map described above.

The first curve over time and the second curve over time are each determined directly prior to the transition in question as a function of the instantaneous input variables of the characteristic map and implemented via clutch controller 30 and vehicle brake controller 35.

Figure 10:
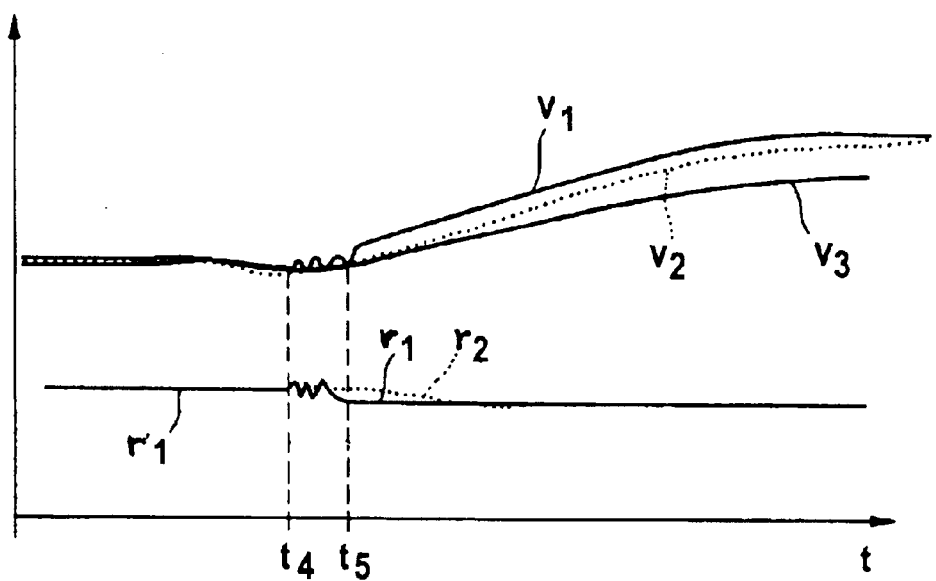
FIG. 10 shows a speed/time diagram to illustrate the functioning of the method and device according to an example embodiment of the present invention.

FIG. 10 shows an example of a curve over time for vehicle speed and wheel torque. Reference symbol v1 represents a first curve for the vehicle speed at which a transition from an engaged-clutch travel mode to a free-wheel mode is initiated at a fifth point in time t4. The transition lasts from fifth point in time t4 to a sixth point in time t5. In the case of first curve v1 for the vehicle speed according to FIG. 10, multiple deceleration and acceleration processes occur during the transition. The vehicle speed in free-wheel mode then increases. A second curve v2 for the vehicle speed is also illustrated in FIG. 10 as a dotted line. In the case of second curve v2, the method according to an example embodiment of the present invention is applied during the transition from fifth point in time t4 to sixth point in time t5, and the output variable of the drive unit is kept largely constant. In the case of second curve v2, therefore, the vehicle speed remains largely constant or continuously increases slightly during the transition without the alternating decelerations and accelerations according to first curve v1. After sixth point in time t5, second curve v2 increases less rapidly, which makes it more comfortable than first curve v1. FIG. 10 also shows a third curve v3 for the vehicle speed which is present in the absence of a switch from engaged-clutch travel mode to free-wheel mode, causing the engine braking torque to be even after sixth point in time t5 as well. Third curve v3 does not have any alternating decelerations and accelerations between fifth point in time t4 and sixth point in time t5, and it increases less rapidly than the two other curves at sixth point in time t5. However, third curve t3 does not achieve the same level of fuel conservation and reduced exhaust gas emissions as first curve v1 and second curve v2 in overrun mode, i.e., in engaged-clutch travel mode.

FIG. 10 also shows a first curve r1 for the wheel torque over time, which results during a transition from engaged-clutch travel mode to free-wheel mode. In this case, fluctuations that are perceived as unpleasant by the driver occur between fifth point in time t4 and sixth point in time t5. According to a second curve r2 for the wheel torque, the method according to an example embodiment of the present invention is applied during the transition from engaged-clutch travel mode to free-wheel mode, causing the wheel torque to be kept more or less constant for the transition period. Only after sixth point in time t5 is the wheel torque continuously reduced according to second curve r2, making it more comfortable to the driver, for example, according to the time-based ramp function described above.

In the diagram illustrated in FIG. 10, it is assumed that a gradient is detected more or less at fifth point in time t4. As a result, the vehicle speed and wheel torque are each largely constant up to fifth point in time t4. Because the gradient is detected around fifth point in time t4, the transition from engaged-clutch travel mode to free-wheel mode is initiated at fifth point in time t4 and terminated at sixth point in time t5, the vehicle speed increasing after sixth point in time t5 on the basis of the characteristic map according to first curve v1 and second curve v2 in free-wheel mode and according to third curve v3 in engaged-clutch travel mode because of the gradient. The increase is the fastest in first curve v1 because the clutch was already disengaged in this curve at fifth point in time t4 without reducing the speed increase via the vehicle brake. According to second curve v2, however, the increase in vehicle speed after sixth point in time t5 is lessened by the vehicle brake intervention, which makes it more comfortable to the driver.

Based on the detected gradient, the wheel torque decreases after sixth point in time t5 of second curve r2, but to a lesser degree than in first curve r1 right during the period of the transition, which is also due to the vehicle brake intervention described above.

The method according to an example embodiment of the present invention is described on the basis of an example in which both a transition from engaged-clutch travel mode to free-wheel mode and from free-wheel mode to engaged-clutch travel mode occurs. Alternatively, the method according to an example embodiment of the present invention may be applied in a corresponding manner if only a transition from engaged-clutch travel mode to free-wheel mode or only a transition from free-wheel mode to engaged-clutch travel mode occurs.

In the case of trucks in which retarders are used, a retarder of this type may take over the function of the vehicle brake intervention. This reduces wear on the brakes.

In the future, predictive safety systems may be implemented in more and more vehicles. These systems determine the distance from the vehicle to another vehicle or traffic obstacle located ahead based on the present traffic situation, for example by evaluating a distance sensor, and they determine a virtual road in which all information along the future route is stored on the basis of digital maps of navigation systems. This makes it possible to determine when the vehicle has reached a down grade.

In the case of vehicle deceleration, the use of free-wheel mode, including shutting down the engine, is a goal of a driving strategy to optimize fuel consumption. The vehicle operates with a disengaged clutch, a shut down engine, and reduced friction. On down grades, this results in a fuel saving potential between 15 and 40 percent. The additional aspect of shutting down the engine in this manner is that a possible catalytic converter cools to a much lesser degree upon shut down of the engine than it does during conventional overrun mode. This reduces pollutants when the engine is subsequently started.

The transition from engaged-clutch travel mode to free-wheel mode or from free-wheel mode to engaged-clutch travel mode may be carried out independently of the driving situation, for example of the detection of a gradient or of a condition determined by the driving situation to end free-wheel mode as a function of the operating state of the drive unit, thereby avoiding unwanted vehicle accelerations and decelerations. The transition, for example from free-wheel mode to engaged-clutch travel mode may be carried out in the method according to an example embodiment of the present invention if it is determined that the braking action of the braking force amplifier is too weak to adequately brake the vehicle when traveling on an inclined roadway. Conversely, the transition from engaged-clutch travel mode to free-wheel mode may be carried out in the method according to an example embodiment of the present invention, for example, when a request from the driver to switch to idling is detected.

In the exemplary embodiments described above, free-wheel mode is the mode in which the vehicle is operated with the clutch completely disengaged. As described in this example, the engine may also be shut down during free-wheel mode.

What is claimed is:

1. A method for controlling a drive unit of a vehicle, comprising:
   a) setting a free-wheel mode, in which the vehicle operates with a clutch disengaged, as a function of one of a driving situation and an operating state of the drive unit; and
   b) setting an output variable of the drive unit to a constant value during a transition between an engaged-clutch travel mode and the free-wheel mode.

2. The method as recited in claim 1, wherein the output variable of the drive unit is set in the setting step by coordinating a clutch intervention and a vehicle brake intervention.

3. The method as recited in claim 1, wherein the output variable is set in the setting step by a regulator.

4. The method as recited in claim 1, wherein the output variable is set in the setting step in accordance with a characteristic map as a function of at least one of an engine speed, an engine drag torque, a vehicle mass, a roadway gradient, an instantaneous gear ratio, an engaged gear and an engaged drive position.

5. The method as recited in claim 1, further comprising canceling a braking action of an activated vehicle brake as a function of one of the driving situation and the operating state of the drive unit after the transition from the engaged-clutch travel mode to the free-wheel mode.

6. The method as recited in claim 1, further comprising increasing a braking action of a vehicle brake as a function of one of the driving situation and the operating state of the drive unit prior to a transition from the free-wheel mode to the engaged-clutch travel mode.

7. The method as recited in claim 1, further comprising shutting down an internal combustion engine of the vehicle in the free-wheel mode.

8. The method as recited in claim 1, further comprising restarting a combustion engine drive by a vehicle engine prior to a transition from the free-wheel mode to the engaged-clutch travel mode by at least one of sequentially employing a fuel injection system, using a charge controller and supported by an electric motor.

9. The method as recited in claim 1, further comprising regulating engine speed to a predefined speed difference from a speed of a power train of the vehicle prior to reconnecting a combustion engine of the vehicle to the power train.

10. The method as recited in claim 1, wherein the output variable of the drive unit includes at least one of torque and vehicle speed.

11. A device for controlling the drive unit of a vehicle that is operated, as a function of one of a driving situation and an operating state of the drive unit, in a free-wheel mode in which the vehicle operates with the clutch disengaged, comprising an arrangement configured to set an output variable of the drive unit to a constant value during a transition between an engaged-clutch travel mode and the free-wheel mode.

12. The device as recited in claim 11, wherein the output variable of the drive unit includes at least one of a torque and a vehicle speed.

13. The device as recited in claim 11, wherein the arrangement is configured to set the output variable of the drive unit in accordance with coordination of a clutch intervention and a vehicle brake intervention.

14. The device as recited in claim 11, wherein the arrangement includes a regulator.

15. The device as recited in claim 11, wherein the arrangement is configured to set the output variable of the drive unit in accordance with a characteristic map as a function of at least one of an engine speed, an engine drag torque, a vehicle mass, a roadway gradient, an instantaneous gear ratio, an engaged gear and an engaged drive position.

16. The device as recited in claim 11, further comprising an arrangement configured to cancel a brake action of an activated vehicle brake as a function of one of the driving situation and the operating state of the drive unit after the transition from the engaged-clutch travel mode to the free-wheel mode.

17. The device as recited in claim 11, further comprising an arrangement configured to increase a brake action of a vehicle brake as a function of one of the driving situation and the operating state of the drive unit prior to a transition from the free-wheel mode to the engaged-clutch travel mode.

18. The device as recited in claim 11, further comprising an arrangement configured to shut down an internal combustion engine of the vehicle in the free-wheel mode.

19. The device as recited in claim 11, further comprising an arrangement configured to restart a combustion engine drive by a vehicle engine prior to a transition from the free-wheel mode to the engaged-clutch travel mode by at least one of sequentially employing a fuel injection system and using a charge controller.

20. The device as recited in claim 11, further comprising an electric motor configured to restart a combustion engine drive by a vehicle engine prior to a transition from the free-wheel mode to the engaged-clutch travel mode.

21. The device as recited in claim 11, further comprising an arrangement configured to regulate engine speed to a predefined speed difference from a speed of a power train of the vehicle prior to reconnection of a combustion engine of the vehicle to the power train.

22. A device for controlling the drive unit of a vehicle, comprising:
   means for operating the drive unit of the vehicle as a function of one of a driving situation and an operating state of the drive unit, in a free-wheel mode in which the vehicle operates with the clutch disengaged; and
   means for setting an output variable of the drive unit to a constant value during a transition between an engaged-clutch travel mode and the free-wheel mode.

* * * * *

UNITED STATES PATENT AND TRADEMARK OFFICE
CERTIFICATE OF CORRECTION

| | |
|---|---|
| PATENT NO. | : 6,951,525 B2 |
| APPLICATION NO. | : 10/785366 |
| DATED | : October 4, 2005 |
| INVENTOR(S) | : Klaus Ries-Mueller et al. |

It is certified that error appears in the above-identified patent and that said Letters Patent is hereby corrected as shown below:

Column 12, line 40, change "a first valve. B0" to --a first valve B0--

Column 12, line 44, change "point in time to" to -point in time t0--

Signed and Sealed this

Twenty-second Day of August, 2006

JON W. DUDAS
*Director of the United States Patent and Trademark Office*